United States Patent [19]

Berndsen et al.

[11] Patent Number: 5,605,754
[45] Date of Patent: Feb. 25, 1997

[54] COATED POLYCARBONATE ARTICLES

[75] Inventors: Josef G. Berndsen, Bergen op Zoom, Netherlands; Luca P. Fontana, Brasschaat, Belgium

[73] Assignee: General Electric Company, Pittsfield, Mass.

[21] Appl. No.: 565,801

[22] Filed: Nov. 30, 1995

[30] Foreign Application Priority Data

Mar. 18, 1995 [EP] European Pat. Off. ............. 95104009

[51] Int. Cl.$^6$ ............................. C08K 5/34; C08F 20/00; C07D 249/16

[52] U.S. Cl. ................ 428/339; 264/176.1; 264/211.24; 264/219; 427/384; 427/385.5; 428/412; 428/336; 524/87; 524/94; 525/439; 525/462; 528/196; 528/199; 528/271; 528/272; 548/259; 548/260; 548/261

[58] Field of Search ....................... 524/87, 94; 528/196, 528/176, 190, 193, 194, 195, 198, 199, 271, 272; 548/259, 260, 261; 264/176.1, 211.24, 219; 428/412, 474.7, 384, 474.9, 402, 385.5, 393.5, 372.2, 35.7, 36.7; 525/439, 462

[56] References Cited

U.S. PATENT DOCUMENTS

| | | | |
|---|---|---|---|
| 2,999,835 | 9/1961 | Goldberg | 524/267 |
| 3,028,365 | 4/1962 | Schnell | 528/196 |
| 3,334,154 | 8/1967 | Kim | 525/469 |
| 3,525,712 | 8/1970 | Kramer | 528/196 |
| 3,541,049 | 11/1970 | Cleveland | 528/202 |
| 3,544,514 | 12/1970 | Schnell | 528/196 |
| 3,635,895 | 1/1972 | Kramer | 528/196 |
| 3,816,373 | 6/1974 | Hoogeboom | 528/196 |
| 4,001,184 | 1/1977 | Scott | 528/196 |
| 4,131,575 | 12/1978 | Adelmann | 528/196 |
| 4,204,047 | 5/1980 | Margotte | 525/67 |
| 4,294,953 | 10/1981 | Quinn et al. | 528/128 |
| 4,430,484 | 2/1984 | Quinn | 525/425 |
| 4,513,037 | 4/1985 | Collins | 428/35 |
| 4,937,130 | 6/1990 | Clagett et al. | 428/35.7 |
| 4,983,706 | 1/1991 | Fontana et al. | 528/176 |
| 5,025,081 | 6/1991 | Fontana et al. | 528/176 |
| 5,108,835 | 4/1992 | Hahnsen et al. | 428/334 |
| 5,321,114 | 6/1994 | Fontana et al. | 528/179 |

FOREIGN PATENT DOCUMENTS 0614926  9/1994  European Pat. Off. .

*Primary Examiner*—Terressa M. Mosley

[57] ABSTRACT

A thermoplastic article having on the outer surface thereof a protective layer having in admixture a trihydricphenol-benzotriazole ultra violet light absorber and a thermoplastic resin preferably a polycarbonate. The protective layer may be coated on the thermoplastic substrate or it may be co-extruded with the thermoplastic substrate.

9 Claims, No Drawings

COATED POLYCARBONATE ARTICLES

BACKGROUND OF THE INVENTION

This invention is directed to a coating for thermoplastic articles such as injection molded articles or plastic sheet. The coating employed in the practice of this invention is an ultra violet (UV) resistant coating comprising in combination a thermoplastic resin and a particular UV absorber. The particular UV absorber is a newly developed benzotriazole based compound and more specifically a trihydric phenol benzotriazole.

Benzotriazoles are known UV absorbers and have polymers including aromatic polycarbonates been widely used as such for different thermoplastic Coatings containing UV absorbers are also known and used to coat plastic molded articles and plastic sheet. One such use is disclosed in U.S. Pat. No. 5,108,835 which discloses a particular UV dimer as a stabilizer in combination with a polycarbonate to prepare a coating composition that can be co-extruded with a thermoplastic resin so that the coating layer is on the outer surface of the article.

DETAILED DESCRIPTION OF THE INVENTION

The present invention is directed to a protective coating composition for thermoplastic substrates such as injection molded substrates or extruded sheet substrates. The protective layer or coating composition can be co-extruded with a thermoplastic substrate such as thermoplastic sheet, extruded thermoplastic profiles such as window frame profiles, walled thermoplastic sheets and other extruded and molded thermoplastic articles.

The coating composition of this invention is a combination of a trihydric phenol-benzotriazole compound (THPE-BZT) and a thermoplastic resin preferably an aromatic polycarbonate thermoplastic resin. The coating composition preferably comprises in admixture about 2 to about 20 weight % of the THPE-BZT and correspondingly about 98 to about 80 weight % of the thermoplastic resin. Examples of the thermoplastic resin that can be employed with the THPE-BZT are saturated polyesters, such as the polyalkylene terephthalates (polybutylene terephthalates and polyethylene terephthalates), polyvinyl chlorides, polyvinylidene chlorides, styrene maleic anhydride, styrene acrylontrile, styrene-acrylontrile-butadiene, polyolefins such as polyethylene and polypropylene, polyacrylates, polymeth-acrylates, polystyrenes, polyphenylene ethers and blends thereof or blends thereof with other polymers. The thermoplastic resin preferably blended with the THPE-BZT is an aromatic polycarbonate. The criteria of the coating composition is that the THPE-BZT and thermoplastic resin be compatible, as well as being compatible with the substrate thermoplastic article.

The THPE-BZT employed in the practice of the this invention corresponds to the following formula.

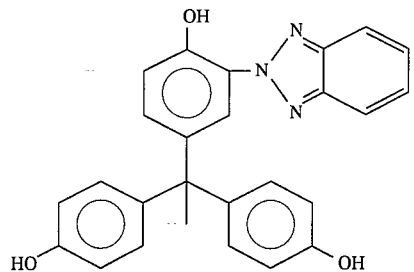

The aromatic polycarbonates employed in the instant invention in combination with THPE-BZT are well known polymers and are disclosed in many U.S. patents such as U.S. Pat. Nos. 2,999,835, 3,334,154 and 4,131,575, all of which are incorporated herein by reference. Such aromatic polycarbonates are prepared from dihydroxy phenols and carbonate precursors. The polycarbonates suitable for use in the instant invention generally have a number average molecular weight of from about 8,000 to about 80,000 and preferably from about 10,000 to about 50,000 and an intrinsic viscosity (I.V.) of about 0.35 to about 1.0 deciliters per gram (dl/g) as measured in methylene chloride at 25° C.

Suitable dihydroxy phenols employed in the preparation of the polycarbonates include for example 2,2-bis(4-hydroxyphenyl) propane, bis(4-hydroxphenyl) methane, 2,2-bis(4-hydroxy-3-methylphenyl) propane, 4,4-bis(4-hydroxyphenyl) heptane, 2,2,-(3,5,3',5'-tetrachloro-4,4'-dihydroxyphenyl) propane, 2,2-(3,5,3',5'tetrabromo-4,4'-dihydroxyphenyl) propane, and 3,3'-dichloro-4,4'-dihydroxydiphenyl) methane. Other dihydroxy phenols which are also suitable for use in the preparation of the above polycarbonates are also disclosed in the above references which have been incorporated herein by reference.

It is of course possible to employ two or more different dihydroxy phenols in preparing the polycarbonates of the invention. In addition, branched polycarbonates such as those described in U.S. Pat. No. 4,001,184 can also be utilized in the practice of the instant invention, as well as blends of a linear aromatic polycarbonate and a branched aromatic polycarbonate. The preferred polycarbonates to be employed in the practice of this invention with the THPE-BZT are the branched polycarbonates. The branched polycarbonate resins may be prepared by reacting (i) at least one dihydroxy phenol of the type described herein, (ii) a carbonate precursor, and (iii) a minor amount of a polyfunctional organic compound. The polyfunctional organic compounds used in making the branched polycarbonates are well known in the art and are disclosed, for example, in the U.S. Pat. Nos. 3,525,712; 3,541,049; 3,544,514; 3,635,895; 3,816,373; 4,001,184; 4,294,953 and 4,204,047, all of which are hereby incorporated herein by reference. These polyfunctional organic compounds are generally aromatic in nature and contain at least three functional groups which may be, for example, hydroxyl, carboxyl, carboxylic anhydride, haloformyl, and the like. Some illustrative non-limiting examples of these polyfunctional compounds include trimellitic anhydride, trim-ellitic acid, trimellityl trichloride, 4-chloro-formyl phthalic anhydride, pyromellitic dianhydride, mellitic acid, mellitic anhydride, trimesic acid, benzophenonetetra-carboxylic acid, benzophenonetetracarboxylic anhydride, and 4,6-dimethyl-2,4,6-tri-(4-hydroxyphenyl) heptene-2. The amount of this polyfunctional organic compound or branching agent used in the range of from about 0.50 to about 2 mole percent based on the amount of dihydric phenol employed, and preferably from about 0.1 to about 1 mole percent.

The processes for preparing the polycarbonate employed in the present invention are well known in the art. There are many patents fully describing the preparation of the polycarbonates including those recited previously herein, and as well as U.S. Pat. Nos. 4,937,130 and 4,513,037, both of which are incorporated herein by reference.

As described in the prior art, a carbonate precursor is employed to prepare the polycarbonates such as a carbonyl halide, a carbonate ester or a haloformate. Typically, the well known carbonate precursor is a carbonyl chloride. A typical carbonate ester is diphenyl carbonate. A typical haloformate is a bishaloformate of a dihydroxyphenol such as the bishaloformate of ethylene glycol. The above carbonate precursors are merely typical of those that can be employed and are not intended to be limiting. Such carbonate precursors are also well known in the art and are listed in the prior art cited previously herein.

The polycarbonate employed herein may also be a copolyestercarbonate as described in U.S. Pat. No. 4,430,484 and in the other references cited in U.S. Pat. No. 4,430,484, which is incorporated herein by reference. Preferred polyestercarbonates are those derived from the dihydroxyphenols and carbonate precursors described above and aromatic dicarboxylic acids or their relative derivatives thereof, such as the acid dihalides, e.g., dichlorides. In addition, a mixture of dicarboxylic acids can be employed such as terephthalic acid and isophthalic acid. Further their respective acid chlorides can also be used. Thus, a useful class of aromatic polyestercarbonates are those prepared from bisphenol-A, terephthalic acid or isophthalic acid or a mixture thereof and a carbonyl chloride also known as phosgene. These copolyester-carbonates are also commonly known as polyphthalate carbonates and are also described in U.S. Pat. No. 4,465,820, incorporated herein by reference.

Another class of polycarbonates that are useful in this invention are the aliphatic copolyester aromatic carbonates derived from a dihydric phenol, a carbonate precursor, and an alphatic alpha omega dicarboxylic acid or ester precursor having about 2 to about 20 carbon atoms. Such aliphatic copolyester aromatic carbonates and the processes for preparing them are fully disclosed in U.S. Pat. Nos. 4,983,706, 5,025,081, and 5,321,114. These aliphatic copolyester aromatic carbonates are made and commercially sold by General Electric Company under the trademark LEXAN® SP.

In preparing the aromatic polycarbonates employed with the THPE-BZT, chain terminators are often preferred. Such terminators are phenol, alkylphenol containing $C_1$-$C_{12}$ alkyl groups, halogenated phenols, hydroxydiphenyls, naphthols, cheorocarbonic acid esters of such phenolic compounds and chloride of aromatic monocarboxylic acids which may optionally be substituted by $C_1$-$C_{22}$ alkyl groups and halogen atoms. The chain terminators are used in quantities of 0.1 to about 10 mol %.

The coating composition of this invention is a protective layer that can be applied by co-extrusion such as co-extrusion of sheet or profiles or by coating from a coating solution. Generally, the coating layer is at least about 5 μm and preferably 5 μm to about 100 μm in thickness but can be thicker depending on the application of the end product. Particularly useful in co-extruded applications are protective layer thicknesses of about 20 μm to about 50 μm.

While the coating or protective layer compositions comprise a combination of a thermoplastic resin and THPE-BZT, any thermoplastic resin or combination of thermoplastic resins may be employed. preferably the thermoplastic resin is an aromatic polycarbonate, a copolyester carbonate resin or an aliphatic copolyester aromatic carbonate. The substrate is also preferably an aromatic polycarbonate resin, an aromatic copolyester carbonate resin or an aliphatic copolyester aromatic carbonate resin. The protective coating layer may also contain other additives such as heat stabilizers or scratch or mar resistant materials particularly a silicaorganpolysiloxane. The additives are well known in the thermoplastic resin area and are well described in the patent literature.

As fully described herein, this invention is limited to the UV absorber trihydricphenol benzotriazole being employed. In outdoor applications, a high loading of UV absorber with high extinction of UV radiation is needed. For good processability, a key property is low volatility of the UV absorber at processing temperatures so as to minimize loss in UV absorber. When exposing the predried pure compound to isothermal TGA at 280° C. for 30 minutes, the THPE-BZT has a significant greater loss than another low volatile UV absorber LA31 from ADK. However, when combining the THPE-BZT with a polycarbonate as is disclosed herein, it was surprisingly discovered that the volatility loss is dramatically reduced.

The following Examples are set forth to illustrate the present invention and are not to be construed as limiting the scope of the invention set forth herein. Unless otherwise indicated, all parts and percentages are on a weight basis.

EXAMPLE 1

The predried UV stabilizers were tested through isothermal TGA at 280° C. for 30 minutes (min.) The samples are weighed after predrying them at 100° C. for minutes under a vacuum and after isothermal TGA exposure at 280° C. for 30 minutes. The loss in weight was determined as a percent loss in weight and the results were as follows:

| Tinuvin 234 | LA31 | THPE-BZT |
| --- | --- | --- |
| 28% | 2.5% | 7.5% |

The loss in weight was due to the loss in volatiles. Tinuvin 234 has a number average molecular weight of about 447 and has the following formula:

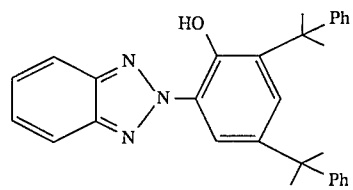

LA31 has a number average molecular weight of about 658 and has the following formula:

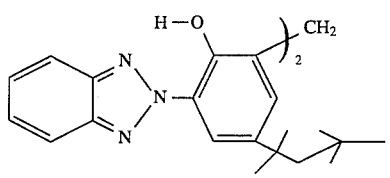

Trihydric phenol-benzotriazole (THPE-BZT) has a number average molecular weight of about 423 and has the following formula:

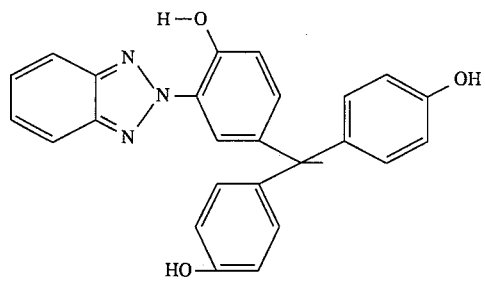

From the above, it can be seen that the volatility loss of Tinuvin 234 and THPE-BZT is greater than that of LA31.

EXAMPLE 2

The UV absorber Tinuvin 234, LA31 and THPE-BZT were individually blended with an aromatic polycarbonate in the form of pellets. Each sample contained about 10% by weight of the particular UV. The samples (pellets) were predried at 110° C. for 120 minutes. The samples after predrying were weighed before and after isothermal TGA exposure at 280° C. for 30 minutes. The results in percent weight loss were as follows:

| Tinuvin 234/PC | LA31/PC * | THPE-BZT/PC * |
|---|---|---|
| 1.2% | 0.19% | 0.18% |
|  | 0.13 | 0.11 |

PC - polycarbonate
* - 2 samples were run

As can be seen from the above results of Example 1, one would not consider THPE-BZT because it is more volatile than LA31 in the pure state, while in the combined state (Example 2), its volatile loss is essentially the same as LA31. Consequently, it has been surprisingly discovered that the use of THPE-BZT in at least a polycarbonate emits a low amount of volatiles and thus makes an excellent protective coating for thermoplastics that are sensitive to UV light.

As can be seen from the above disclosure and description of this invention, other modifications and variations are possible. It is understood, however, that changes may be made in the particular embodiment of this invention which are within the full intended scope of the invention as defined by the appended claims.

What is claimed is:

1. A thermoplastic coated article comprising a protective layer of at least 5 μm and an ultra violet light sensitive substrate wherein the protective layer comprises a blend of 2–20% by weight of a trihydricphenol-benzotriazol of the formula:

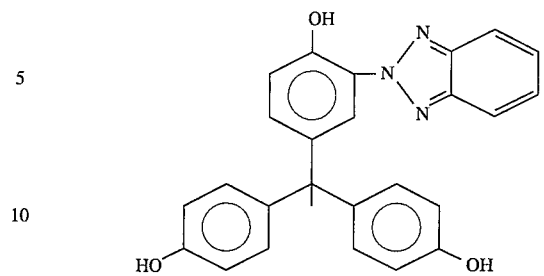

and correspondingly 98 to 80 weight % of an aromatic polycarbonate resin, an aromatic copolyester carbonate resin or an aliphatic copolyester aromatic carbonate resin.

2. A method for improving the ultra violet light resistance of an ultra violet light sensitive thermoplastic article by applying to the outer surface of the ultra violet sensitive article a protective layer of at least 5 μm comprising a blend of 2–20 weight percent of a trihydricphenol-benzotriazole ultra violet absorber of the formula

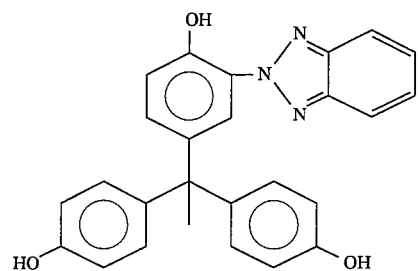

and correspondingly 98–80 weight percent of an aromatic polycarbonate resin, an aromatic copolyester carbonate resin or an aliphatic copolyester aromatic carbonate resin.

3. A method as defined in claim 2 wherein the protective layer is about 5 μm to about 100 μm.

4. A method as defined in claim 2 wherein the protective layer comprises the ultra violet absorber and the thermoplastic resin is an aromatic polycarbonate.

5. A method as defined in claim 2 wherein the ultra violet light sensitive article is an aromatic polycarbonate.

6. The method of claim 2 wherein the protective layer is applied by solution coating the ultra violet light sensitive thermoplastic article and drying the coated article.

7. The method of claim 2 wherein the substrate and protective layer are co-extruded.

8. A method as defined in claim 2 wherein the ultra violet light sensitive thermoplastic is an aromatic copolyester carbonate.

9. A method as defined in claim 2 wherein the ultra violet light sensitive thermoplastic is an aliphatic copolyester aromatic carbonate.

* * * * *